(12) United States Patent
Binfet et al.

(10) Patent No.: US 9,174,514 B2
(45) Date of Patent: Nov. 3, 2015

(54) GLASS OPERATION BASED ON TEMPERATURE INPUT/VEHICLE SPEED, FINAL LOGIC DECIDED BY CUSTOMER

(71) Applicants: Michael T. Binfet, Bellefontaine, OH (US); Jason S. Borland, Marysville, OH (US); David G. Peterson, East Liberty, OH (US)

(72) Inventors: Michael T. Binfet, Bellefontaine, OH (US); Jason S. Borland, Marysville, OH (US); David G. Peterson, East Liberty, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/967,813

(22) Filed: Aug. 15, 2013

(65) Prior Publication Data

US 2015/0048764 A1    Feb. 19, 2015

(51) Int. Cl.
| | |
|---|---|
| *B60J 1/17* | (2006.01) |
| *E05F 15/695* | (2015.01) |
| *E05F 15/71* | (2015.01) |
| *B60J 10/10* | (2006.01) |

(52) U.S. Cl.
CPC .. *B60J 1/17* (2013.01); *B60J 10/10* (2013.01); *E05F 15/695* (2015.01); *E05F 15/71* (2015.01); *E05Y 2800/414* (2013.01); *E05Y 2900/508* (2013.01)

(58) Field of Classification Search
CPC .......... B60H 1/26; B60H 1/265; B60H 1/267; B60J 1/08; B60J 1/12; B60J 1/17; E05F 1/004; E05F 2700/02; E05F 15/695; E05F 15/71

USPC ............ 296/107.07, 107.09, 107.16, 146.14; 454/75; 236/49.3; 318/283, 286
See application file for complete search history.

(56) References Cited

U.S. PATENT DOCUMENTS

| | | | | |
|---|---|---|---|---|
| 4,852,469 | A | * | 8/1989 | Chuang ........................ 454/75 |
| 5,054,686 | A | | 10/1991 | Chuang |
| 5,110,175 | A | | 5/1992 | Fischbach |
| 5,222,661 | A | | 6/1993 | Wenhart |
| 6,054,821 | A | | 4/2000 | Koch et al. |
| 6,246,199 | B1 | | 6/2001 | Porter et al. |
| 6,402,227 | B1 | | 6/2002 | Riehle et al. |
| 6,582,009 | B2 | | 6/2003 | Wezyk et al. |

(Continued)

FOREIGN PATENT DOCUMENTS

DE    20 2007 002 415 U1    12/2007

OTHER PUBLICATIONS

FKT GmbH—Windschott, www.fkt-gmbh.com/deu/produkte/windschott.html, printed Aug. 15, 2013.

*Primary Examiner* — Jason S Daniels
(74) *Attorney, Agent, or Firm* — Fay Sharpe LLP

(57) ABSTRACT

A system and method for operating a window of an automotive vehicle having a convertible top includes at least one powered window selectively driven by a motor. A controller is operatively connected to the motor and sends a signal for positioning the powered window to one of a raised or lowered position in response to lowering of the convertible top. An input or selector is operatively associated with the controller that allows a user to select one of the raised and lowered positions of the at least one powered window in response to lowering the convertible top. Further, a temperature sensor provides a signal indicative of the external temperature and/or a vehicle speed sensor provides a signal indicative of the vehicle speed so that positioning of the window can be temperature dependent and/or vehicle speed dependent.

17 Claims, 1 Drawing Sheet

(56) References Cited

U.S. PATENT DOCUMENTS

| | | | |
|---|---|---|---|
| 6,601,905 B1 | 8/2003 | Klauzenberg et al. |
| 6,630,807 B2 | 10/2003 | Pehrson et al. |
| 6,733,065 B2 | 5/2004 | Schindler et al. |
| 6,748,308 B2 | 6/2004 | Losey |
| 6,867,562 B2 | 3/2005 | Weiner et al. |
| 7,878,011 B2 | 2/2011 | Heil et al. |
| 8,080,961 B2 | 12/2011 | Miller |

* cited by examiner

GLASS OPERATION BASED ON TEMPERATURE INPUT/VEHICLE SPEED, FINAL LOGIC DECIDED BY CUSTOMER

BACKGROUND

When operating a convertible top, a window(s) or glass (typically referenced herein as a window or powered window) must operate in order to clear the moving seals between the powered window and the convertible top. When the convertible top is fully stowed, there are two known operation modes for the window. In a first mode, the window is lowered or drops into the door or a cavity in a side panel in the vehicle body. In a second mode, the window is raised or returns to a full up position.

Once the convertible top is lowered, raising the window may be preferred by a vehicle occupant (driver or passenger) for reasons such as to prevent wind buffeting and to minimize noise when the convertible top is down. Other vehicle occupants may want the window down for a fully open effect.

The outside temperature may also play a part in the decision. The choice to raise or lower the window after a convertible top lowering operation (i.e., opening the convertible top and storing the convertible top) is entirely determined by the original equipment manufacturer (OEM) or automotive vehicle manufacturer. However, the OEM does provide the vehicle driver or passenger with opportunities to subsequently raise or lower the window as desired with individual or combined window switches. Some vehicle occupants may feel inconvenienced with this operation if their preference is opposite that choice provided by the OEM.

In a similar manner, vehicle occupants may desire that the windows be in a first position (e.g., lowered position) at low vehicle speeds, and in a different or second position (e.g., raised or partially raised position) at increased speeds. The change in window position could be desired because of temperature, comfort, noise, etc., or combinations of one or more these reasons, and likewise a particular speed at which such a change could occur may vary from that selected by the OEM or from one vehicle owner to another.

Thus, a need exists to provide increased flexibility to a vehicle owner/occupant with regard to an initial, default position of the window(s) after storage of the lowered convertible top.

SUMMARY

A system and method for raising and lowering an automotive vehicle window with final logic decided by the vehicle owner/occupant is provided.

In one embodiment, the system and method are based at least in part on outside temperature and/or vehicle speed input.

A system for operating a powered window of an automotive vehicle having a convertible top includes at least one powered window selectively driven by a motor. A controller is operatively connected to the motor and is configured to position the powered window to one of a raised or lowered position in response to lowering of the convertible top. An input of the controller allows an associated user to select one of the raised and lowered window positions in response to lowering the convertible top.

The system further includes a sensor operatively connected to the controller where the sensor monitors a temperature outside of the automotive vehicle and/or monitors vehicle speed.

The controller is configured to default operation of the at least one powered window in response to a selected, predetermined temperature outside of the automotive vehicle, in response to a user selected threshold vehicle speed, or in response to first reaching one of the selected temperature or vehicle speed.

The system may further include a user input to the controller that allows the user to choose operation of the motor to position the at least one window after the convertible top has been lowered among one of (i) a temperature-based operation responsive to a predetermined temperature and/or vehicle speed, (ii) the raised position, and (iii) the lowered position.

The user input includes a temperature selector for choosing the predetermined temperature (which may include selecting an OEM suggested predetermined temperature or a different temperature), and/or a vehicle speed selector for choosing a threshold speed at which the window positions are altered.

A method of positioning powered windows in an automotive vehicle that has a convertible top includes positioning at least one powered window in either a raised or a lowered position after the convertible top has been lowered, and selecting one of the raised and lowered positions of the at least one powered window in response to lowering the convertible top.

The selecting step includes changing a default selection of the at least one powered window.

The selecting step includes a default selection that positions the at least one powered window based on a predetermined temperature and/or vehicle speed.

The method further includes sensing a temperature outside of the automotive vehicle and selecting the raised or lowered position of the powered window after lowering of the convertible top based on the sensed temperature, selecting a threshold vehicle speed for changing the position of the powered window.

A primary benefit of the present disclosure resides in the ability for a vehicle driver or passenger to alter a default position of the powered window.

The present disclosure also improves the marketability of the window operation for potential customers.

Yet another benefit is associated with operating the powered window in response to an outside temperature and/or vehicle speed.

Still another advantage resides in the opportunity for the vehicle owner/occupant to program their preference through a customization menu provided in the vehicle.

Still other benefits and advantages will become apparent to those skilled in the art upon reading and understanding the following detailed description.

DETAILED DESCRIPTION

Figure 1:
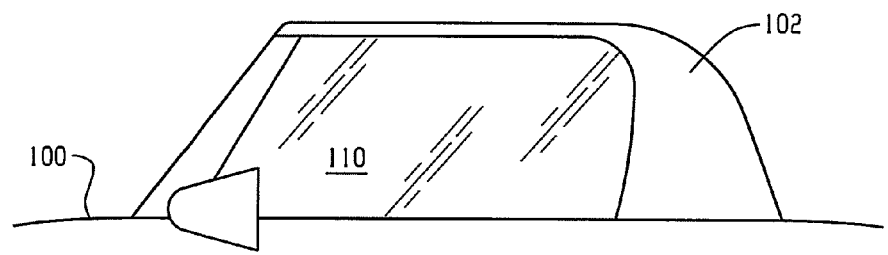
FIG. 1 is a representation of a vehicle having a convertible top.
Figure 2:
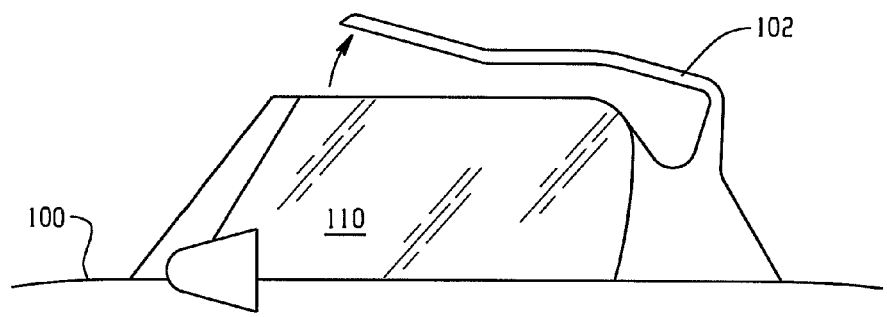
FIG. 2 shows the vehicle of FIG. 1 during initial lowering of the convertible top.
Figure 3:
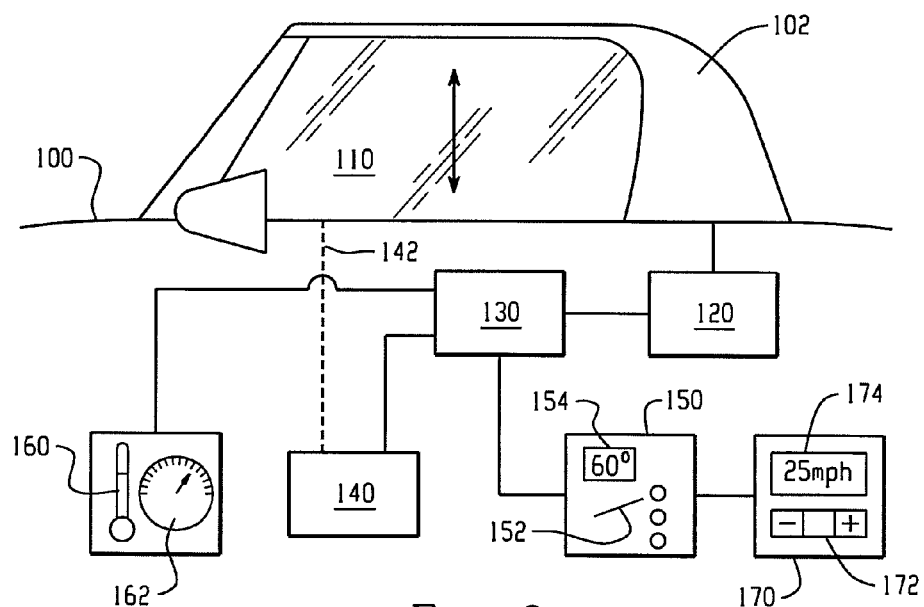
FIG. 3 is a schematic representation of operation of the window in connection with the convertible top, a default selector, and an external temperature sensor.

FIGS. 1-3 show a portion of a vehicle 100 that includes a convertible top 102. In FIG. 1, the convertible top 102 is shown in a raised or deployed position while FIG. 2 represents initial stages of lowering the convertible top to a lowered or storage position (not shown). Lastly, FIG. 3 shows the convertible top 102 in broken line to more particularly illustrate the details of the present disclosure. The schematic representation in FIG. 3 demonstrates the concepts and features associated with the operation of a powered window 110.

More specifically, one of the powered windows 110 is shown in FIGS. 1-3. It will be appreciated, however, that details of the present disclosure are applicable to multiple powered windows 110 provided on a vehicle. Thus, reference to and description of a single powered window is only for sake of convenience since the reference or description is fully applicable to at least one powered window, or multiple powered windows. Multiple powered windows are common in some vehicles and may include, for example, driver side front and rear powered windows 110, and similarly, passenger side front and rear powered windows 110. In other instances, and as represented in the Figures, the vehicle may have only two powered windows 110, namely, one on each side of the vehicle (i.e., one in each door). Therefore, description of one of the powered windows 110 is fully applicable to the other powered windows. Further, the assembly and operation of powered windows and the lifting mechanism associated therewith are well known in the art so that further description herein of these details is deemed unnecessary. It is common for each powered window 110 to have its own motor for raising and lowering the respective window relative to the vehicle 100 either automatically based on data stored in a controller 130 or in response to operator control of the powered window.

During an initial lowering of the convertible top 102, the window 110 is typically lowered a small amount in order to clear moving seals between the window 110 and the convertible top 102. Thus, a comparison of FIGS. 1 and 2 shows that the window 110 in FIG. 1 is fully raised and engaged along a header portion (not shown) with seal(s) (not shown) that are associated with the convertible top 102. In FIG. 2, the window 110 has been lowered a slight amount to separate the upper edge of the powered window 110 from the window seal (not shown) associated with the convertible top 102. Through the remainder of the lowering process of the convertible top 102, the powered window 110 is typically stationary.

Once the convertible top 102 has been fully lowered, then the powered windows 110 are positioned in a "default position" as defined at the OEM or automotive vehicle manufacturer. The default position may be a raised or fully raised window 110 or alternatively the default position may be a lowered or fully lowered window 110. For example, some vehicle occupants prefer that the window 110 be raised to prevent wind buffeting. The raised window also advantageously minimizes noise when the convertible top 102 is down. Alternatively, some vehicle occupants prefer the window 110 to be in a down, preferably a completely lowered, position to provide a full open feeling of a convertible vehicle with the convertible top 102 down.

Whether the window 110 is raised or lowered after the lowering operation of the convertible top 102 has been completed is entirely a choice of the OEM. Of course it is recognized that a vehicle occupant can subsequently raise (partially or fully) or lower (partially or fully) one or more of the windows 110 from a default position as desired.

The present disclosure provides greater options and variability for an occupant (drive or passenger(s)) of the vehicle 100. As particularly shown in FIG. 3, a first motor 120 is operatively associated with the convertible top 102. Again, the details of the first motor 120, interconnection with the convertible top 102, and operation of the first motor and associated mechanism (not shown) in raising and lowering the convertible top 102 relative to the vehicle 100 are well known and need not be further described herein. The motor 120 is also operatively connected with a controller 130.

A second motor 140 (or more typically a series of second motors 140, one for each window 110) is also operatively connected with the controller 130. Broken line 142 represents the interconnection of the powered window 110 with its associated motor 140. Again, the details of the second motor 140, interconnection with the mechanism for raising/lowering the window 110, and the operation of raising and lowering the window relative to the vehicle 100 are well known in the art and need not be further described herein to gain a full and complete understanding of the present disclosure.

A temperature input or selector 150 is schematically represented in FIG. 3. The selector 150 is operatively connected with the controller 130. The selector 150 can adopt a wide variety of forms and may include a movable button or switch 152, a touchscreen 154, etc. (generally referred to herein as a switch) that allows a vehicle occupant to alter or select the default operation of the powered window 110 in the convertible vehicle 100. For example, a default position of the window 110 after lowering of the convertible top 102 is usually established at the vehicle assembly plant. The selector 150 can have at least a first and a second position, one of which is the same as the factory default position set at the vehicle assembly plant, and the other position being the opposite of the factory default position. For example, if the default position is to locate the window 110 in a raised position after the convertible top 102 has been lowered, a vehicle occupant can position switch 152 in a first position representative of the factory default position (i.e., the raised window position is selected). Alternatively, the vehicle occupant can change the switch 152 to a second position that is opposite the factory default position (e.g. window 110 is a lowered position after the convertible top 102 has been lowered). Of course one skilled in the art will recognize that these relative positions will be different if a default position is a lowered position after the convertible top 102 has been lowered.

In addition, the system can include a first or temperature sensor 160 that monitors an external temperature of the vehicle 100. The first sensor 160 provides a signal to the controller 130 indicative of the external temperature. Operation of the window 110 can thus be temperature dependent. That is, the window 110 can be lowered when the external temperature is above, for example, 60° F. Of course this temperature is merely representative and one skilled in the art will appreciate that other temperatures can be used as the threshold level without departing from scope and intent of the present disclosure. On the other hand, if the external temperature is below 60° F., then the window 110 is raised. This positioning of the window 110 based on the external temperature overrides the default window position determined at the vehicle assembly plant.

It is also contemplated that the vehicle occupant can change or select an external temperature threshold (e.g., 64° F. (or some other temperature) rather than 60° F.) that determines whether the window is raised or lowered when the external temperature is above or below the newly selected temperature level. For example, the vehicle owner/occupant can program a preference through a customization menu provided in the vehicle as exemplified by touchscreen 154.

In a similar manner, the vehicle occupant can keep the OEM setting, or change or select a vehicle speed at which the position of the windows would be potentially moved. By way of example only, the OEM could establish a default condition where the vehicle windows are in a lowered position when the vehicle speed is below a predetermined level such as 25 mph.

Once the vehicle reaches this speed, the position of the windows can be changed, such as being raised to a partial or fully raised position.

This is illustrated in the drawings as a second or vehicle speed sensor 162 that provides a suitable signal to the controller 130. Additionally, a second selector 170 with a switch 172, and/or touchscreen 174 is provided. Operation of the window 110 can thus be made dependent on the speed of the vehicle. That is, the window 110 can be raised when the vehicle speed reaches or exceeds a predetermined vehicle speed, for example, 25 mph. Of course this speed is merely a representative example and one skilled in the art will appreciate that other threshold speeds can be used without departing from scope and intent of the present disclosure. On the other hand, if the vehicle speed is below 25 mph, then the window 110 remains partially or completely lowered. This positioning of the window 110 based on the vehicle speed overrides the default window position determined at the vehicle assembly plant.

It is also contemplated that the vehicle occupant can change or select an alternative vehicle speed threshold (e.g., 35 mph (or some other speed)) that determines whether the window is raised or lowered depending on the vehicle speed above or below the newly selected vehicle speed. For example, the vehicle owner/occupant can program a preference vehicle speed through a customization menu provided in the vehicle as exemplified by touchscreen 174.

It is also contemplated by this disclosure that the position of the windows after lowering the convertible top can be made dependent on either the external temperature or the vehicle speed. Thus, the controller can be made change the position of the window(s) in response to initially reaching either the temperature or the vehicle speed threshold. Likewise, once the window(s) has been re-positioned, the second signal relating to the second threshold being reached is ignored by the controller.

Thus it is contemplated that in one version of the present disclosure, the vehicle occupant has the ability to alter the default position of the window 110 once the convertible top 102 has been lowered. For example, if the assembly plant establishes a default position where the window 110 is lowered after retraction of the convertible top 102, the vehicle occupant can select a new default where the window 110 is raised after retraction of the convertible top 102, and vice versa, or the vehicle occupant can select or confirm the factory default position.

In another version of the present disclosure, the vehicle occupant has the ability to choose one of three options after the convertible top 102 has been lowered: (a) the windows 110 are lowered, (b) the windows 110 are raised, or (c) the default position of the powered windows 110 is made external temperature dependent and/or vehicle speed dependent. Likewise, a modification of this temperature dependent/vehicle speed dependent version of the system also provides the additional option of allowing the vehicle occupant to select an external temperature threshold or vehicle speed threshold so that the window 110 is raised when the external temperature is below the selected temperature threshold, and the window 110 is lowered when the external temperature is above the selected temperature threshold, and/or the window 110110 is raised when the vehicle speed is above the selected vehicle speed threshold, and the window 110 is lowered when the vehicle speed is below the selected vehicle speed threshold.

The vehicle occupant can choose the final logic to be applied and in this manner, the vehicle occupant has the final choice in deciding operation of the window 110. Again, one skilled in the art will appreciate that at least one window 110 operated by an associated motor 140 is positioned at a desired height relative to the vehicle, i.e., either raised or lowered depending on the logic from controller 130. The controller 130 receives inputs from the operation of the convertible top 102 through its associated motor 120, and also receives input from selector 150, and/or external temperature sensor 160, and/or vehicle speed sensor 162.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

It is claimed:

1. A system for operating a window of an automotive vehicle having a convertible top, the system comprising:
   at least one powered window selectively driven by a motor;
   a controller operatively connected to the motor that sends a signal for automatically positioning the powered window to one of a raised or lowered position in response to lowering of the convertible top;
   a first sensor and a second sensor operatively connected to the controller, the first sensor monitoring a temperature outside of the automotive vehicle and the second sensor monitoring a vehicle speed; and
   an input operatively associated with the controller that allows a user to select one of 3 different, default modes of the raised and lowered positions of the at least one powered window in response to lowering the convertible top including
   (i) always lower the at least one powered window as a first default mode
   (ii) always raise the at least one powered window as a second default mode
   (iii) use outside temperature and/or velocity of the vehicle to raise or lower the at least one powered window as a third default mode.

2. The system of claim 1 wherein the controller is configured to default operation of the at least one powered window in response to at least one of a predetermined temperature outside of the automotive vehicle and a predetermined vehicle speed.

3. The system of claim 1 wherein the lowered position is a fully lowered position of the at least one powered window.

4. The system of claim 1 wherein the raised position is a fully raised position of the at least one powered window.

5. The system of claim 1 wherein the controller signals the motor to at least partially lower the at least one powered window during lowering of the convertible top.

6. A system for automatically positioning power-operated windows of a convertible automotive vehicle in an initial position after a convertible top is lowered, the system comprising:
   a convertible top operated by a first motor for movement between a raised and a lowered position;
   at least one window operated by at least one second motor for movement between the raised and lowered positions;

a controller operatively interconnected with the first motor and the second motors and configured to operate the at least one second motor to position the at least one window in a desired one of the raised and lowered positions after the convertible top has reached the lowered position;

a first sensor that monitors a temperature outside of the automotive vehicle and provides temperature data to the controller and a second sensor that monitors a vehicle speed and provides vehicle speed data to the controller; and a user input to the controller that allows a user to choose operation of the at least one second motor to automatically position the at least one window after the convertible top has been lowered among one of user selected default modes:

(i) a temperature-based operation of the at least one second motor relative to a predetermined temperature, and a vehicle speed-based operation of the at least one second motor relative to a predetermined vehicle speed, (ii) the raised position, and (iii) the lowered position.

7. The system of claim 6 wherein the user input includes a temperature selector for choosing the predetermined temperature for the temperature-based operation of the at least one second motor and a vehicle speed selector for choosing the predetermined vehicle speed for operation of the at least one second motor.

8. The system of claim 6 wherein the lowered position is a fully lowered position of the at least one window.

9. The system of claim 6 wherein the raised position is a fully raised position of the at least one window.

10. The system of claim 6 wherein the controller signals the at least one second motor to partially lower the at least one window during lowering of the convertible top.

11. The system of claim 10 wherein the temperature sensor is overridden by the user selection of positioning the at least one window after the convertible top lowering step.

12. A method of positioning powered windows in an automotive vehicle that includes a convertible top, the method comprising:

automatically positioning at least one powered window in either a raised or a lowered position after the convertible top has been lowered; and selecting one of the raised and lowered positions of the at least one powered window in response to lowering the convertible top, wherein the selecting step includes overriding a user selected default mode and instead automatically positions the at least one powered window based on at least a predetermined temperature and predetermined vehicle speed.

13. The method of claim 12 wherein the selecting step includes changing a default selection of the at least one powered window.

14. The method of claim 12 wherein the selecting step includes raising the at least one powered window to a fully raised position or lowering the at least one powered window to a fully lowered position.

15. The method of claim 12 further comprising lowering the convertible top and partially lowering at least one powered window during the convertible top lowering step.

16. The method of claim 12 further comprising sensing of a temperature outside of the automotive vehicle and a vehicle speed.

17. The method of claim 16 wherein the step of selecting the raised or lowered position of the powered window after lowering of the convertible top is based on the sensed temperature and sensed vehicle speed.

* * * * *